(12) United States Patent
Wachter et al.

(10) Patent No.: US 9,066,308 B2
(45) Date of Patent: Jun. 23, 2015

(54) METHOD AND APPARATUS FOR USING SUPPORTED NETWORK INFORMATION FOR POSITIONING

(75) Inventors: Andreas K. Wachter, San Francisco, CA (US); Ie-Hong Lin, Fremont, CA (US); Kirk Allan Burroughs, Alamo, CA (US); Stephen W. Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1675 days.

(21) Appl. No.: 11/950,335

(22) Filed: Dec. 4, 2007

(65) Prior Publication Data

US 2009/0143076 A1 Jun. 4, 2009

(51) Int. Cl.
*H04W 24/00* (2009.01)
*H04W 64/00* (2009.01)
*G01S 5/02* (2010.01)

(52) U.S. Cl.
CPC ............. *H04W 64/00* (2013.01); *G01S 5/0236* (2013.01)

(58) Field of Classification Search
CPC .................................................... H04W 24/00
USPC ........... 455/456.1–456.6, 452.2, 432.1, 435.1
See application file for complete search history.

(56) References Cited

U.S. PATENT DOCUMENTS

| | | | |
|---|---|---|---|
| 6,470,186 B1 * | 10/2002 | Whikehart et al. | 455/456.1 |
| 7,577,441 B2 * | 8/2009 | Nonoyama | 455/456.1 |
| 7,613,155 B2 * | 11/2009 | Shim | 370/338 |
| 7,729,706 B2 * | 6/2010 | Kim et al. | 455/456.1 |
| 8,019,355 B2 * | 9/2011 | Shim | 455/456.1 |
| 2006/0036680 A1 * | 2/2006 | Shim | 709/203 |
| 2007/0167177 A1 * | 7/2007 | Kraufvelin | 455/466 |

\* cited by examiner

*Primary Examiner* — Michael T Vu
(74) *Attorney, Agent, or Firm* — Thien T. Nguyen (57) ABSTRACT

Techniques to support positioning for terminals in Secure User Plane Location (SUPL) are described. A SUPL Enabled Terminal (SET) may receive supported network information from a SUPL Location Platform (SLP), which is a location server in SUPL. The supported network information may indicate one or more radio access networks supported by the SLP, one or more types of measurement supported by the SLP, and/or information that the SET is allowed to send to the SLP. The SET may send network measurement information for a supported radio access network to the SLP. The network measurement information may include cell and/or access point (AP) information for one or more access points or base stations in the supported radio access network. The SLP may determine a location estimate for the SET based on the network measurement information from the SET.

34 Claims, 5 Drawing Sheets

METHOD AND APPARATUS FOR USING SUPPORTED NETWORK INFORMATION FOR POSITIONING

BACKGROUND

I. Field

The present disclosure relates generally to communication, and more specifically to techniques for supporting positioning.

II. Background

Wireless communication networks are widely deployed to provide various communication services such as voice, video, packet data, messaging, broadcast, etc. These wireless networks may be multiple-access networks capable of supporting communication for multiple users by sharing the available network resources. Examples of such multiple-access networks include Code Division Multiple Access (CDMA) networks, Time Division Multiple Access (TDMA) networks, Frequency Division Multiple Access (FDMA) networks, and Orthogonal FDMA (OFDMA) networks.

It is often desirable, and sometimes necessary, to know the location of a terminal in a wireless network. The terms "location" and "position" are synonymous and are used interchangeably herein. For example, a user may utilize the terminal to browse through a website and may click on location sensitive content. The location of the terminal may then be determined and used to provide appropriate content to the user. There are many other scenarios in which knowledge of the location of the terminal is useful or necessary.

Various positioning methods may be used to determine the location of a terminal. Each positioning method may use certain information and may require certain capabilities at the terminal and/or a location server in order to compute a location estimate for the terminal. It is desirable to support positioning in an efficient manner in order to conserve resources and reduce delay.

SUMMARY

Techniques to support positioning for terminals are described herein. Positioning refers to a process to measure/compute a geographic location estimate of a target device. A location estimate may also be referred to as a position estimate, a position fix, etc. Positioning may be supported with a location architecture/solution such as Secure User Plane Location (SUPL) from Open Mobile Alliance (OMA).

In an aspect, a SUPL Enabled Terminal (SET) may receive supported network information from a SUPL Location Platform (SLP), which is a location server in SUPL. The supported network information may indicate one or more radio access networks supported by the SLP, one or more measurement parameters and/or types of measurement supported by the SLP, and/or information that the SET is allowed to send to the SLP. The SET may send network measurement information for a supported radio access network to the SLP. The network measurement information may include cell and/or access point (AP) information comprising measurements and/or other information for one or more access points or base stations in the supported radio access network. The SLP may determine a location estimate for the SET based on the network measurement information received from the SET. The SLP may then send the location estimate to the SET or a SUPL Agent.

Various aspects and features of the disclosure are described in further detail below.

DETAILED DESCRIPTION

Techniques for supporting positioning in wireless networks are described herein. The techniques may be used for various wireless networks such as wireless wide area networks (WWANs), wireless metropolitan area networks (WMANs), wireless local area networks (WLANs), broadcast networks, etc. The terms "network" and "system" are often used interchangeably.

A WWAN is a wireless network that provides communication coverage for a large geographic area such as, e.g., a city, a state, or an entire country. A WWAN may be a cellular network such as a CDMA network, a TDMA network, an FDMA network, an OFDMA network, etc. A CDMA network may implement a radio technology such as Wideband CDMA (WCDMA), cdma2000, Time Division-Synchronous Code Division Multiple Access (TD-SCDMA), etc. cdma2000 covers IS-2000, IS-95, and IS-856 standards. In the description below, the term "CDMA" refers to cdma2000. A TDMA network may implement a radio technology such as Global System for Mobile Communications (GSM). An OFDMA network may implement a radio technology such as Ultra Mobile Broadband (UMB), Long Term Evolution (LTE), Flash-OFDM®, etc. These various radio technologies and standards are known in the art. WCDMA, GSM and LTE are described in documents from an organization named "3rd Generation Partnership Project" (3GPP). CDMA and UMB are described in documents from an organization named "3rd Generation Partnership Project 2" (3GPP2). 3GPP and 3GPP2 documents are publicly available.

A WLAN is a wireless network that provides communication coverage for a small or medium geographic area such as, e.g., a building, a shop, a mall, a home, etc. A WLAN may implement a radio technology such as any defined by IEEE 802.11, Hiperlan, etc. A WMAN may implement a radio technology such as any defined by IEEE 802.16. IEEE 802.11 and 802.16 are two families of standards from The Institute of Electrical and Electronics Engineers (IEEE). The IEEE 802.11 family includes 802.11a, 802.11b, 802.11g and 802.11n standards and is commonly referred to as Wi-Fi. The IEEE 802.16 family includes 802.16e and 802.16m standards and is commonly referred to as WiMAX.

Figure 1:
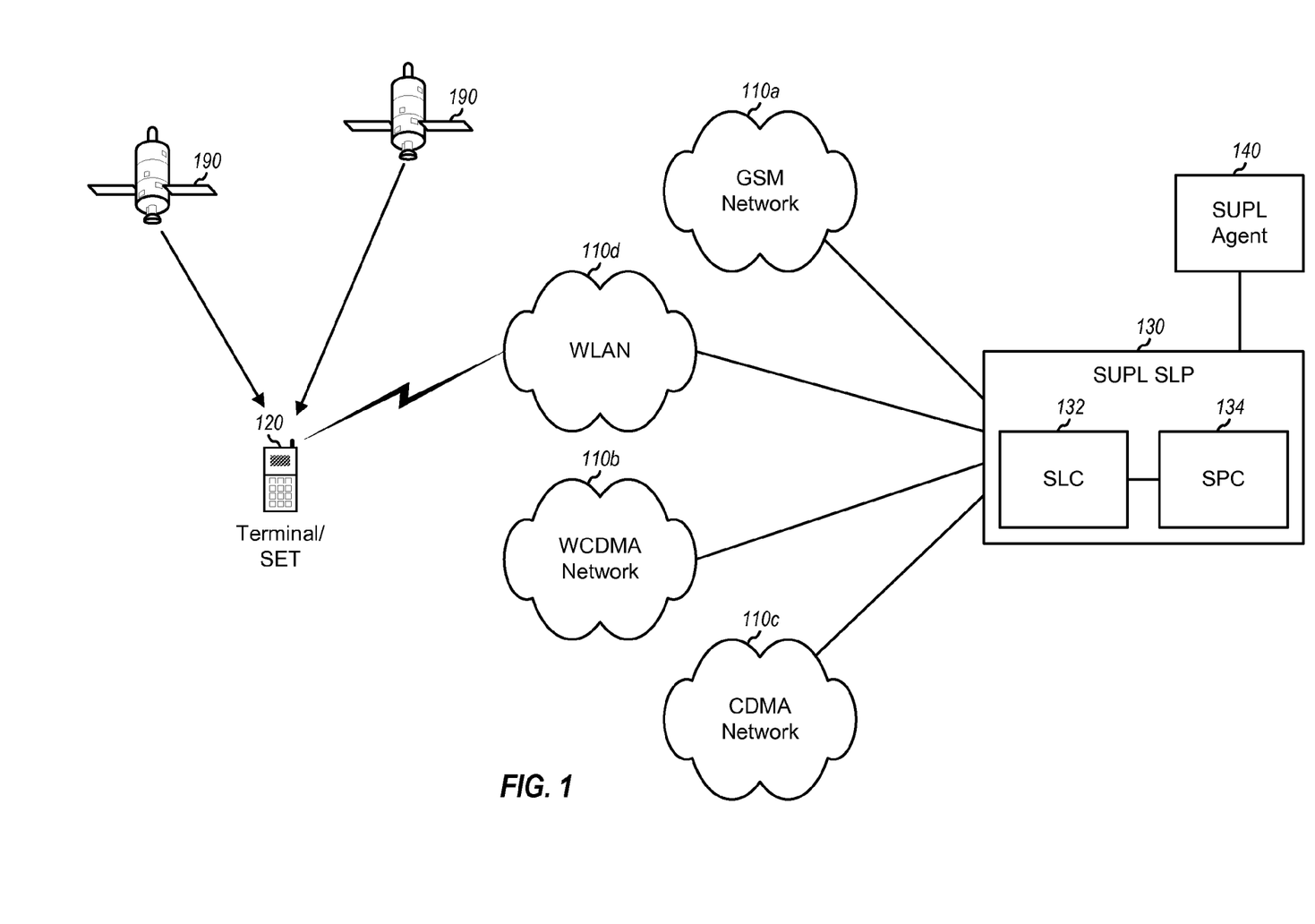
FIG. 1 shows a deployment of different radio access networks.

FIG. 1 shows an example deployment of different radio access networks (RANs), which include a GSM network 110a, a WCDMA network 110b, a CDMA network 110c, and a WLAN 110d. A radio access network supports radio communication for terminals and may be all or part of a WWAN, a WMAN, or a WLAN. For example, a WWAN may include a radio access network, a core network, and/or other networks, and only the radio access network portion is shown in FIG. 1 for simplicity. A radio access network may also be referred to as a radio network, an access network, etc. GSM network 110a, WCDMA network 110b, and CDMA network 110c may each include any number of base stations that support radio communication for terminals within their coverage areas. A base station may also be referred to as a Node B, an evolved Node B, etc. In GSM and WCDMA networks, the term "cell" can refer to the smallest coverage area of a base station and/or the base station subsystem serving this coverage area. In CDMA networks, the term "sector" can refer to the smallest coverage area of a base station and/or the base station subsystem serving this coverage area. WLAN 110d may include any number of access points (WLAN APs) that support radio communication for terminals associated with these access points.

A terminal 120 may communicate with GSM network 110a, WCDMA network 110b, CDMA network 110c, or WLAN 110d at any given moment to obtain communication services. Terminal 120 may also simply receive signals from these networks in order to make measurements or obtain information useful in computing its location. Terminal 120 may be stationary or mobile and may also be referred to as a mobile station, a user equipment, a subscriber station, a station, etc. A terminal may be a cellular phone, a personal digital assistant (PDA), a handheld device, a wireless device, a laptop computer, a wireless modem, a cordless phone, a telemetry device, a tracking device, etc. Terminal 120 may also be referred to as a SUPL Enabled Terminal (SET) in SUPL. The terms "terminal" and "SET" are used interchangeably herein.

SET 120 may receive and measure signals from satellites 190 to obtain pseudo-range measurements for the satellites. Satellites 190 may be part of the United States Global Positioning System (GPS), the European Galileo system, the Russian GLONASS system, or some other satellite positioning system (SPS). SET 120 may also receive and measure signals from access points in WLAN 110d and/or signals from base stations in radio access networks 110a, 110b and/or 110c to obtain timing and/or signal strength measurements for the access points and/or base stations. SET 120 may communicate with one radio access network and may, at the same time or an earlier time, receive and measure signals from access points and/or base stations in other radio access networks to obtain measurements for these other access points and/or base stations. The measurements for satellites 190 and/or the measurements for the access points and/or base stations may be used to determine the location of SET 120.

A SUPL Location Platform (SLP) 130 may communicate with SET 120 to support location services and/or positioning for the SET. The communication between SLP 130 and SET 120 may be via any one of radio access networks 110a through 110d and/or via other networks (e.g., the Internet). SLP 130 may be separate from radio access networks 110a, 110b, 110c and 110d and may be separate from or part of a WWAN that includes radio access network 110a, 110b, 110c and/or 110d. SLP 130 may be a Home SLP (H-SLP), a Visited SLP (V-SLP), or an Emergency SLP (E-SLP).

SLP 130 may support SUPL service management and positioning for terminals communicating with radio access networks 110a through 110d. SUPL service management may include managing locations of SETs and storing, extracting, and modifying location information of target SETs. SLP 130 may include a SUPL Location Center (SLC) 132 and a SUPL Positioning Center (SPC) 134. SLC 132 may perform various functions for location services, coordinate the operation of SUPL, and interact with SETs over user plane bearer. SLC 132 may perform functions for privacy, initiation, security, roaming support, charging/billing, service management, position calculation, etc. SPC 134 may support positioning for SETs and delivery of assistance data to the SETs and may also be responsible for messages and procedures used for position calculation. SPC 134 may perform functions for security, assistance data delivery, reference retrieval, position calculation, etc. SPC 134 may have access to GPS receivers (a reference network, perhaps a global one) and may receive signals for satellites so that it can provide assistance data.

A SUPL agent 140 may communicate with SLP 130 to obtain location information for SET 120. A SUPL agent is a service access point that accesses network resources to obtain location information. Location information may comprise a location estimate and/or any information related to location. SET 120 may also have a SUPL agent that is resident within the SET. SET 120, SLP 130, and SUPL Agent 140 may each support any SUPL version. SUPL Version 2.0 (SUPL 2.0) is described in OMA-AD-SUPL-V2, entitled "Secure User Plane Location Architecture," Aug. 31, 2007, and OMA-TS-ULP-V2, entitled "UserPlane Location Protocol," Sep. 27, 2007. These SUPL documents are publicly available from OMA.

SET 120 may support one or more positioning methods, or measurements for one or more positioning methods, which may be used to determine the location of the SET. Table 1 lists some positioning methods that may be supported by SET 120 and provides a short description of each positioning method. Advanced Forward Link Trilateration (AFLT), Enhanced Observed Time Difference (E-OTD), and Observed Time Difference Of Arrival (OTDOA) are positioning methods based on measurements for base stations in a radio access network. In Table 1 as well as much of the description herein, "GPS" generically refers to positioning based on any satellite positioning system, e.g., GPS, Galileo, GLONASS, etc.

TABLE 1

| Positioning Method | Description |
| --- | --- |
| Cell-ID | Location estimate is derived based on the identity (ID) of either a cell or WLAN AP serving area in which a terminal is located. Accuracy is dependent on the size of the cell or AP serving area. |
| Enhanced Cell-ID | Location estimate is derived based on cell or AP ID and measurements for round trip delay (RTD), signal strength, etc. Information may be restricted to one cell or AP or may be provided for several cells and/or APs. In the latter case, triangulation may be employed if multiple RTDs are available. |
| AFLT, E-OTD, OTDOA | Location estimate is derived based on timing measurements for base stations in a radio access network. |
| Assisted GPS | Location estimate is derived based on satellite measurements with assistance from a network. |
| Autonomous GPS | Location estimate is derived based on satellite measurements without assistance from any network. |

SET 120 may be capable of communicating with different radio access networks and/or may support different positioning methods. SLP 130 may also support different positioning methods and/or different radio access networks, which may or may not match the positioning methods and radio access networks supported by SET 120.

In an aspect, SLP 130 may send supported network information to SET 120 to inform the SET of the type(s) of network measurement information supported by the SLP. The supported network information may be used as a filter in terms of which network measurement information that SET 120 can and/or cannot send to SLP 130. The supported network information may also be used as a request indicating which network measurement information SET 120 should send to SLP 130, e.g., in the event that SET 120 only has resources or time to obtain a subset of all possible network measurement information. SET 120 may send only the network measurement information supported by SLP 130. The supported network information may also be used as reporting criteria for stored historical enhanced cell/sector and WLAN AP measurements.

Figure 2:
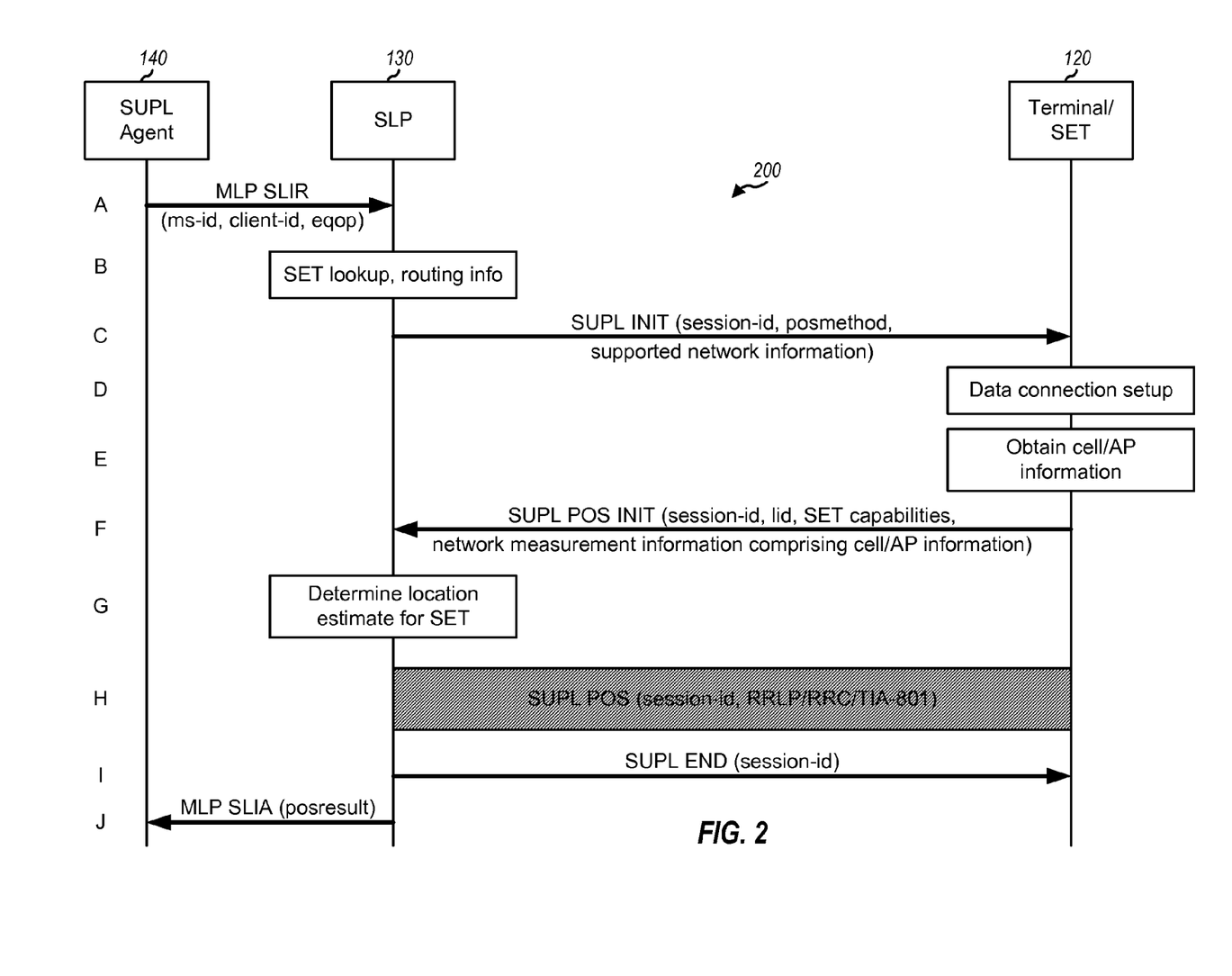
FIG. 2 shows a message flow for network-initiated location services.

FIG. 2 shows a design of a message flow 200 for network-initiated location services in SUPL using supported network information. SUPL agent 140 may desire location information for SET 120 and may send a Mobile Location Protocol (MLP) Standard Location Immediate Request (SLIR) message to SLP 130 (step A). SLP 130 may authenticate and authorize SUPL agent 140 for the requested location information. SLP 130 may then obtain routing information for SET 120 (step B).

SLP 130 may send a SUPL INIT message to initiate a location session with SET 120 (step C). The SUPL INIT message may include a session-id used to identify the location session, an intended positioning method (posmethod), the desired quality of positioning (QoP), supported network information, etc. Upon receiving the SUPL INIT message, SET 120 may perform a data connection setup procedure, attach itself to a packet data network if the SET is not already attached, and establish a secure IP connection to SLP 130 (step D).

SET 120 may obtain cell or AP information for the radio access network with which SET 120 currently communicates and/or for other radio access networks whose signals SET 120 currently receives or has received (step E). In general, the cell/AP information may include any information for one or more base stations, access points, and/or terminals, which may be pertinent for positioning of a SET. SET 120 may send a SUPL POS INIT message to SLP 130 (step F). The SUPL POS INIT message may include the session-id, network measurement information comprising the cell/AP information allowed by the supported network information received from SLP 130, and possibly other information such as the SET capabilities (e.g., supported positioning methods and protocols), request for assistance data, etc. SLP 130 may determine a location estimate for SET 120 based on the cell/AP information received from the SET (step G). If the location estimate obtained from the cell/AP information is of sufficient quality, then SLP 130 may send a SUPL END message to SET 120 (step I) and may send the requested location information in an MLP Standard Location Immediate Answer (SLIA) message to SUPL agent 140 (step J).

If a location estimate of sufficient quality is not obtained based on the cell/AP information received from SET 120, then SLP 130 and SET 120 may exchange messages for a positioning session (step H). For SET-assisted positioning, SLP 130 may calculate a location estimate for SET 120 based on positioning measurements received from the SET. For SET-based positioning, SET 120 may calculate the location estimate based on assistance from SLP 130. The location estimate, if any, obtained in step G may be used to assist step H (e.g., may be used to provide assistance data to SET 120 for positioning methods such as A-GPS) and/or may be used to verify and improve any location estimate resulting from step H. In any case, upon completing the positioning session, SLP 130 may send a SUPL END message to SET 120 (step I) and may also send the requested location information to SUPL agent 140 (step J).

Figure 3:
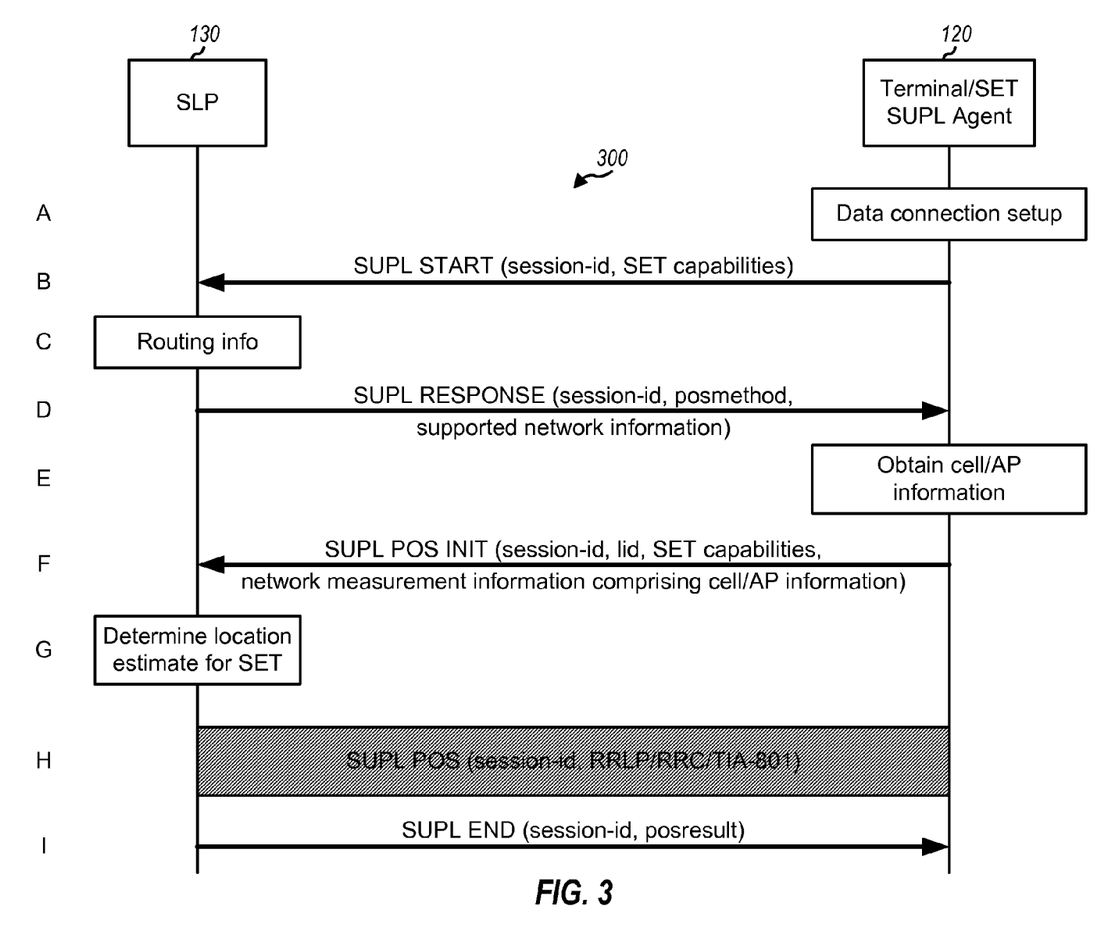
FIG. 3 shows a message flow for SET-initiated location services.

FIG. 3 shows a design of a message flow 300 for SET-initiated location services in SUPL using supported network information. A SUPL agent on SET 120 may receive a request for location information from an application running on the SET. SET 120 may perform a data connection setup procedure, attach itself to a packet data network if necessary, and establish a secure IP connection to SLP 130 (step A). SET 120 may then send a SUPL START message to initiate a location session with SLP 130 (step B). The SUPL START message may include a session-id, the SET capabilities, etc. SLP 130 may determine that SET 120 is currently not roaming for SUPL (step C). SLP 130 may then send to SET 120 a SUPL RESPONSE message that may include the session-id, a selected positioning method, supported network information, etc. (step D).

SET 120 may obtain cell or AP information for the radio access network with which SET 120 currently communicates and/or other radio access networks whose signals SET 120 currently receives or has received (step E, which may occur any time). SET 120 may then send to SLP 130 a SUPL POS INIT message that may include the session-id, network measurement information comprising the cell/AP information allowed by the supported network information received from SLP 130, and possibly other information (step F). SLP 130 may determine a location estimate for SET 120 based on the cell/AP information received from the SET (step G). If the location estimate is of sufficient quality, then SLP 130 may send to SET 120 a SUPL END message that may include the requested location information (step I). If a location estimate of sufficient quality is not obtained based on the cell/AP information, then SLP 130 and SET 120 may exchange messages for a positioning session (step H). The location estimate, if any, obtained in step G may be used to assist step H (e.g., may be used to provide assistance data to SET 120 for positioning methods such as A-GPS) and/or may be used to verify and improve any location estimate resulting from step H. Upon completing the positioning session, SLP 130 may send a SUPL END message with the requested location information to SET 120 (step I).

In one design, SLP 130 may send the supported network information to SET 120 in any of the SUPL messages shown in Table 2. The formats of various SUPL messages are described in the aforementioned OMA-TS-ULP-V2 documents.

TABLE 2

| SUPL Message | Description |
| --- | --- |
| SUPL INIT | Sent by the SLP for a network-initiated SUPL session. |
| SUPL RESPONSE | Sent by the SLP in response to a SUPL START message sent by the SET for a SET-initiated SUPL session. |
| SUPL TRIGGERED RESPONSE | Sent by the SLP in response to a SUPL TRIGGERED START message sent by the SET for a triggered SUPL session. |

In one design, the supported network information sent by SLP 130 to SET 120 may include any of the information shown in Table 3. The GSM, WCDMA and CDMA information in Table 3 may also be referred to as GSM, WCDMA and CDMA cell information, respectively. In the tables below, an "M" in a Presence column indicates a mandatory parameter, an "O" indicates an optional parameter, and a "CV" indicates a parameter that is conditional on value.

TABLE 3

Supported Network Information

| Parameter | Presence | Value/Description |
|---|---|---|
| WLAN | M | The value of this parameter is "true" or "false". If "true", it indicates the SET is allowed to send WLAN AP information within the Multiple Location IDs. If "false", the SET does not send WLAN AP information within the Multiple Location IDs. |
| Supported WLAN Information | O | This parameter provides a map of flags indicating which WLAN AP information the SET may send for a current serving WLAN AP in the Location ID parameter. It also indicates which WLAN AP information the SET may send in the Multiple Location IDs parameter when WLAN is set to "true": <br> AP transmit power <br> AP antenna gain <br> AP signal-to-noise ratio (S/N) received at the SET <br> Device type (802.11a/b/g) <br> AP signal strength at the SET <br> AP channel/frequency of TX/RX <br> Round trip delay between the SET and AP <br> SET transmit power <br> SET antenna gain <br> SET signal-to-noise ratio received at the AP <br> SET signal strength at the AP <br> AP location as reported by the AP |
| GSM | M | The value of this parameter is "true" or "false". If "true", it indicates the SET is allowed to send GSM information as part of Location ID within Multiple Location IDs. If "false", the SET does not send GSM information within Multiple Location IDs. |
| WCDMA | M | The value of this parameter is "true" or "false". If "true", it indicates the SET is allowed to send WCDMA information as part of Location ID within Multiple Location IDs. If "false", the SET does not send WCDMA information within Multiple Location IDs. |
| Supported WCDMA Information | CV | This parameter provides a map of flags indicating which WCDMA network measurements the SET may send for the current serving cell in the Location ID parameter. It also indicates which WCDMA network measurements the SET may send in the Multiple Location IDs parameter when WCDMA is set to "true": <br> MRL (Measured Results List) |
| CDMA | M | The value of this parameter is "true" or "false". If "true", it indicates the SET is allowed to send CDMA information as part of Location ID within Multiple Location IDs. If "false", the SET does not send CDMA information within Multiple Location IDs. |
| Historic | M | The value of this parameter is "true" or "false". If "true", it indicates the SET is allowed to send historic information as part of Location ID within Multiple Location IDs. If "false", the SET does not send historic information within Multiple Location IDs. |
| Non-serving | M | The value of this parameter is "true" or "false". If "true", it indicates the SET is allowed to send information for non-serving as well as serving cells and WLAN APs as part of Location ID within Multiple Location IDs. If "false", the SET may only send information for serving cells or serving WLAN APs within Multiple Location IDs. |
| UTRAN GPS Reference Time | O | The value of this parameter is "true" or "false". If true, it indicates that the SLP is requesting UTRAN GPS Reference Time as measured by the SET. |
| UTRAN GANSS Reference Time | O | The value of this parameter is "true" or "false". If true, it indicates that the SLP is requesting UTRAN GANSS Reference Time as measured by the SET. |

Table 3 shows a specific design of the supported network information. In general, the supported network information may include any information/parameter that may be used to control which information a SET can send to an SLP for positioning.

SET 120 may send cell or AP information to SLP 130 for positioning. The cell/AP information may be sent in a Location ID parameter or a Multiple Location IDs parameter. In general, the Location ID parameter and the Multiple Location IDs parameter may be sent in various SUPL messages for various SET-initiated and network-initiated SUPL sessions. For example, these parameters may be included in any of the SUPL messages shown in Table 4.

TABLE 4

| SUPL Message | Description |
| --- | --- |
| SUPL START | Sent by the SET for a SET-initiated SUPL session. |
| SUPL POS INIT | Sent by the SET following a SUPL INIT message for a network-initiated SUPL session or a SUPL RESPONSE message for a SET-initiated SUPL session. Also sent by the SET one or more times following a SUPL TRIGGERED RESPONSE message for a SET-initiated or network-initiated SUPL triggered session. |
| SUPL TRIGGERED START | Sent by the SET to start a triggered SUPL session. |
| SUPL REPORT | May be sent by the SET one or more times following a SUPL TRIGGERED RESPONSE message for a network-initiated SUPL triggered session. May also be sent by the SET following a SUPL INIT message for a network-initiated SUPL historic position session. |

Tables for various parameters in SUPL messages are given below. In a table for a given SUPL parameter, the first row of the table gives a short description of the SUPL parameter. Subsequent rows give different fields/parameters of the SUPL parameter, with each field being indicated by symbol ">". A given field/parameter may have subfields, with each subfield being indicated by symbol ">>". A given subfield may have sub-subfields, with each sub-subfield being indicated by symbol ">>>".

In one design, the Location ID parameter may include any of the information shown in Table 5. The Cell Info parameter may include GSM cell information, WCDMA cell information, CDMA cell information, or WLAN AP information. The Status parameter may indicate the status of the cell/AP information included in the Cell Info parameter.

TABLE 5

Location ID Parameter

| Parameter | Presence | Value/Description |
| --- | --- | --- |
| Location ID | — | Describes the globally unique cell or WLAN AP identification of the most current serving cell or serving WLAN AP. |
| >Cell Info | M | The following cell IDs are supported: GSM Cell Info WCDMA Cell Info CDMA Cell Info WLAN AP Info |
| >Status | M | Describes whether or not the cell or WLAN AP info is: Not Current, last known cell/AP info Current, the present cell/AP info Unknown (i.e. not known whether the cell/AP id is current or not current) NOTE: The Status parameter does not apply to WCDMA optional parameters (Frequency Info, Primary Scrambling Code and Measured Results List). Frequency Info, Primary Scrambling Code and Measured Results List, if present, are always considered to be correct for the current cell. |

In one design, the Multiple Location IDs parameter may include any of the information shown in Table 6. The Multiple Location IDs parameter may include one or more Location ID parameters for one or more radio access networks, which may be obtained at the same time or different times. The Multiple Location IDs parameter may be used, e.g., to report WLAN measurements, cellular base station measurements, and other position related data for multiple access points and base stations near SET 120 at both the current time and recent times in the past.

TABLE 6

Multiple Location IDs Parameter

| Parameter | Presence | Value/Description |
| --- | --- | --- |
| Multiple Location ID | — | This parameter contains a set of up to MaxLidSize Location ID/Relative Timestamp data. |
| Location ID | M | Describes measured globally unique cell/AP identification of the serving cell/AP or cell/AP identification from any receivable radio network. The measured cell/AP identifications may be from different radio access networks measured at the same time or at different times. |
| Relative Timestamp | CV | Time stamp of measured location Id relative to "current location id" in units of 0.01 sec. Range from 0 to 65535 * 0.01 sec. Time stamp for current location Id if present is 0. The Relative Timestamp is present if the Location ID info is historical and may be omitted if the Location ID info is current. |
| Serving Cell Flag | M | This flag indicates whether the Location ID info represents a serving cell or WLAN AP or an idle (i.e., camped-on) cell or WLAN AP. If set, the Location ID info represents serving cell or WLAN AP information. If not set, the Location ID info represents idle mode information or neighbor cell or WLAN AP information. |

In one design, the WLAN AP information sent by SET 120 in the Cell Info parameter of the Location ID parameter in Table 5 may include any of the information shown in Table 7.

TABLE 7

WLAN AP Information

| Parameter | Presence | Value/Description |
|---|---|---|
| WLAN AP Info | — | WLAN Access Point ID |
| >AP MAC Address | M | Access Point MAC Address |
| >AP Transmit Power | O | AP transmit power in dBm |
| >AP Antenna Gain | O | AP antenna gain in dBi |
| >AP S/N | O | AP S/N received at the SET in dB |
| >Device Type | O | Options are:<br>802.11a device,<br>802.11b device, and<br>802.11g device.<br>Future networks are permitted. |
| >AP Signal Strength | O | AP signal strength received at the SET in dBm |
| >AP Channel/Frequency | O | AP channel/frequency of Tx/Rx |
| >Round Trip Delay | O | Round trip delay (RTD) between the SET and AP |
| >>RTD Value | M | Measured RTD value |
| >>RTD Units | M | Units for RTD value and RTD accuracy - 0.1, 1, 10, 100 or 1000 nanoseconds |
| >>RTD Accuracy | O | RTD standard deviation in relative units |
| >SET Transmit Power | O | SET transmit power in dBm |
| >SET Antenna Gain | O | SET antenna gain in dBi |
| >SET S/N | O | SET S/N received at the AP in dB |
| >SET Signal Strength | O | SET signal strength received at the AP in dBm |
| >AP Reported Location | O | Location of the AP as reported by the AP |
| >>Location Encoding | M | Location encoding description<br>LCI as per RFC 3825<br>Text as per RFC 4119<br>ASN.1 as per X.694 |
| >>Location Data | M | Location Data |
| >>>Location Accuracy | O | Location Accuracy in units of 0.1 meter |
| >>>Location Value | M | Location value in the format defined in Location Encoding |

In one design, the GSM cell information sent by SET 120 in the Cell Info parameter of the Location ID parameter in Table 5 may include any of the information shown in Table 8.

TABLE 8

GSM Cell Information

| Parameter | Presence | Value/Description |
|---|---|---|
| Gsm Cell Info | — | GSM Cell ID |
| >MCC | M | Mobile Country Code, range: (0 . . . 999) |
| >MNC | M | Mobile Network Code, range: (0 . . . 999) |
| >LAC | M | Location Area Code, range: (0 . . . 65535) |
| >CI | M | Cell Identity, range: (0 . . . 65535) |

TABLE 8-continued

GSM Cell Information

| Parameter | Presence | Value/Description |
|---|---|---|
| >NMR | O | Network Measurement Report - can be present for 1 to 15 cells. |
| >>ARFCN | M | ARFCN, range: (0 . . . 1023) |
| >>BSIC | M | BSIC, range: (0 . . . 63) |
| >>RXLev | M | RXLEV, range: (0 . . . 63) |
| >TA | O | Timing Advance, range: (0 . . . 255) |

In one design, the WCDMA cell information sent by SET 120 in the Cell Info parameter of the Location ID parameter in Table 5 may include any of the information shown in Table 9.

TABLE 9

WCDMA Cell Information

| Parameter | Presence | Value/Description |
|---|---|---|
| Wcdma/TD-SCDMA Cell Info | — | WCDMA Cell ID |
| >MCC | M | Mobile Country Code, range: (0 . . . 999) |
| >MNC | M | Mobile Network Code, range: (0 . . . 999) |
| >UC-ID | M | Cell Identity, range: (0 . . . 268435455). UC-ID is composed of RNC-ID and C-ID. |
| >Frequency Info | O | Frequency info can be:<br>fdd:<br>uarfcn-UL, range: (0 . . . 16383)<br>uarfcn-DL, range: (0 . . . 16383)<br>In case of fdd, uarfcn-UL is optional while uarfcn-DL is mandatory. If uarfcn-UL is not present, the default duplex distance defined for the operating |

TABLE 9-continued

WCDMA Cell Information

| Parameter | Presence | Value/Description |
|---|---|---|
| | | frequency band shall be used [3GPP RRC]. tdd: uarfcn-Nt, range: (0 ... 16383) NOTE: Frequency Info and Primary Scrambling Code are always those of the current cell. |
| >Primary Scrambling Code | O | Primary Scrambling Code, range: (0 ... 511) |
| >Measured Results List | O | Network Measurement Report for WCDMA comprising both intra- and/or inter-frequency cell measurements (as per 3GPP TS 25.331). |

In one design, the CDMA cell information sent by SET 120 in the Cell Info parameter of the Location ID parameter in Table 5 may include any of the information shown in Table 10.

TABLE 10

CDMA Cell Information

| Parameter | Presence | Value/Description |
|---|---|---|
| Cdma Cell Info | — | CDMA Cell ID |
| >NID | CV | Network ID, range: (0 ... 65535) This parameter is conditional and only used for 1x in which case it is mandatory. |
| >SID | CV | System ID, range: (0 ... 32767) This parameter is conditional and only used for 1x in which case it is mandatory. |
| >BASEID | CV | Base Station ID, range: (0 ... 65535) This parameter is conditional and only used for 1x in which case it is mandatory. |
| >SECTORID | CV | Sector ID, length 128 bits This parameter is conditional and only used for HRPD (1xEV-DO) in which case it is mandatory. |
| >BASELAT | M | Base Station Latitude, range: (0 ... 4194303) |
| >BASELONG | M | Base Station Longitude, range: (0 ... 8388607) |
| >REFPN | CV | Base Station PN Number, range: (0 ... 511) This parameter is conditional and only used for 1x in which case it is mandatory. |
| >WeekNumber | M | GPS Week number, range: (0 ... 65535) |
| >Seconds | M | GPS Seconds, range: (0 ... 4194303) |

Tables 7 through 10 show specific designs of WLAN AP information, GSM cell information, WCDMA cell information, and CDMA cell information. In general, the cell/AP information for a given radio access network may comprise any information that may be used for positioning of a SET.

With the features in Tables 3 through 10, SET 120 may efficiently send cell/AP information for different supported radio access networks to SLP 130. In particular, SET 120 may send cell/AP information only for radio access networks and measurement parameters supported by SLP 130 and not for radio access networks and measurement parameters not supported by SLP 130. This may reduce waste of radio and processing resources and may also reduce delay to send cell/AP information that SLP 130 cannot use.

Figure 4:
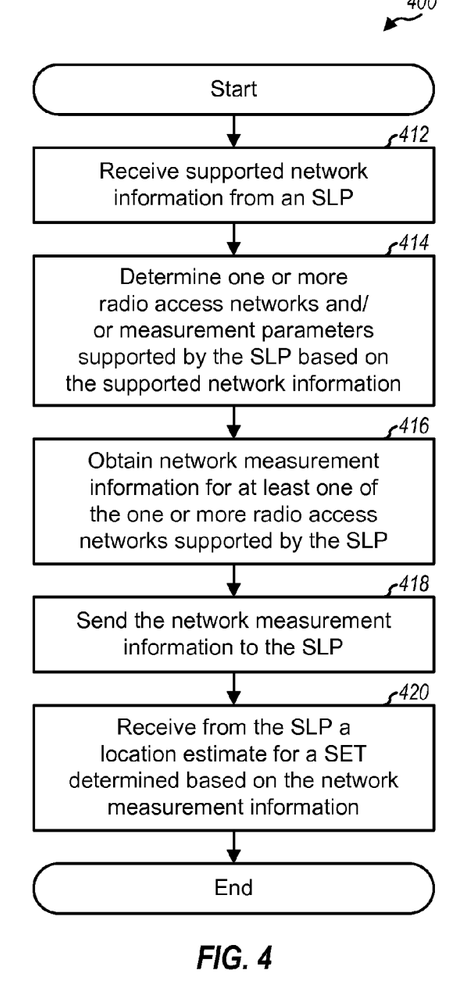
FIG. 4 shows a process performed by a terminal/SET for positioning.

FIG. 4 shows a design of a process 400 performed by a terminal/SET for positioning in SUPL. Supported network information may be received from an SLP (block 412). One or more radio access networks and/or measurement parameters supported by the SLP may be determined based on the supported network information (block 414). For example, the supported network information may indicate whether the SLP supports WLAN, CDMA, WCDMA and/or GSM. The supported network information may also indicate which measurement and/or which information may be sent by the SET. The supported network information may comprise any of the information shown in Table 3 and/or other information.

Network measurement information may be obtained for at least one of the one or more radio access networks supported by the SLP (block 416). The network measurement information may be obtained at or near the present time or may be previously obtained and stored by the SET. The network measurement information may be sent to the SLP (block 418). The supported network information may indicate that the SLP supports WLAN, and WLAN AP information may be sent as the network measurement information. The supported network information may indicate that the SLP supports CDMA, and CDMA cell information may be sent as the network measurement information. The supported network information may indicate that the SLP supports WCDMA, and WCDMA cell information may be sent as the network measurement information. The supported network information may indicate that the SLP supports GSM, and GSM cell information may be sent as the network measurement information. The supported network information may indicate that the SET is allowed to send historic network measurement information, and the SET may send such information. The supported network information may indicate that the SET is allowed to send network measurement information for non-serving cells or non-serving access points, and the SET may send such information. The supported network information may indicate that the SET is allowed to send only certain measurement parameters for a particular supported RAN (e.g., WLAN, GSM, CDMA or WCDMA), and the SET may send only such measurement parameters. In any case, a location estimate for the SET, which may be determined by the SLP based on the network measurement information from the SET, may be received from the SLP (block 420). Alternatively, the location estimate may be used to provide appropriate assistance data to the SET and/or may be used to improve another location estimate obtained by other means.

For a network-initiated SUPL session, the supported network information may be received in a SUPL INIT message, and the network measurement information may be sent in a SUPL POS INIT message, e.g., as shown in FIG. 2. For a SET-initiated SUPL session, the supported network information may be received in a SUPL RESPONSE message or a SUPL TRIGGERED RESPONSE message, and the network measurement information may be sent in a SUPL POS INIT message, e.g., as shown in FIG. 3.

Figure 5:
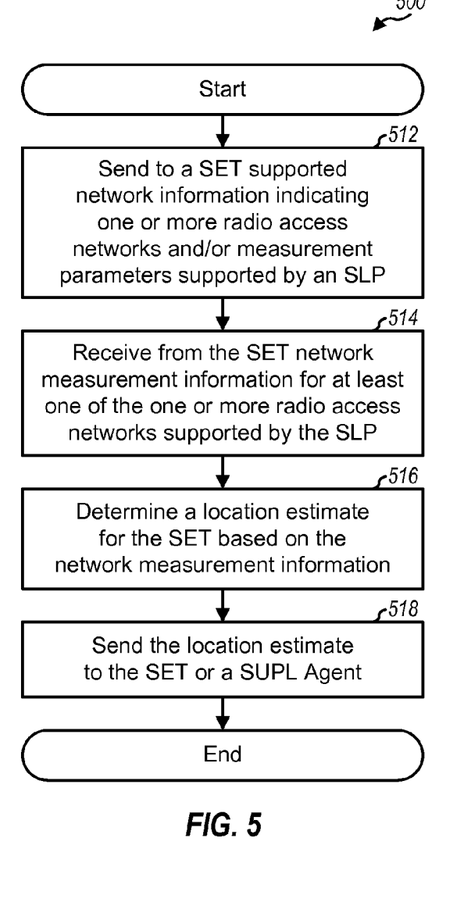
FIG. 5 shows a process performed by an SLP for positioning.

FIG. 5 shows a design of a process 500 performed by an SLP to support positioning in SUPL. Supported network information indicating one or more radio access networks and/or measurement parameters supported by the SLP may be sent to a terminal/SET (block 512). The supported network information may indicate which measurement and/or which information may be sent by the SET. Network measurement information for at least one of the one or more radio access networks supported by the SLP may be received from the SET (block 514). For a network-initiated SUPL session, the supported network information may be sent in a SUPL INIT message, and the network measurement information may be received in a SUPL POS INIT message, e.g., as shown in FIG. 2. For a SET-initiated SUPL session, the supported network information may be sent in a SUPL RESPONSE message or a SUPL TRIGGERED RESPONSE message, and the network measurement information may be received in a SUPL POS INIT message, e.g., as shown in FIG. 3.

A location estimate for the SET may be determined based on or assisted by the network measurement information received from the SET (block 516). The location estimate may be sent to the SET or a SUPL Agent (block 518).

For clarity, the techniques to support positioning for terminals have been specifically described for SUPL. The techniques may also be used for other location architectures/solutions such as X.S0024. In X.S0024, a Position Server (PS) may perform functions similar to those performed by SLC 132, and a Position Determining Entity (PDE) may perform functions similar to those performed by SPC 134.

Figure 6:
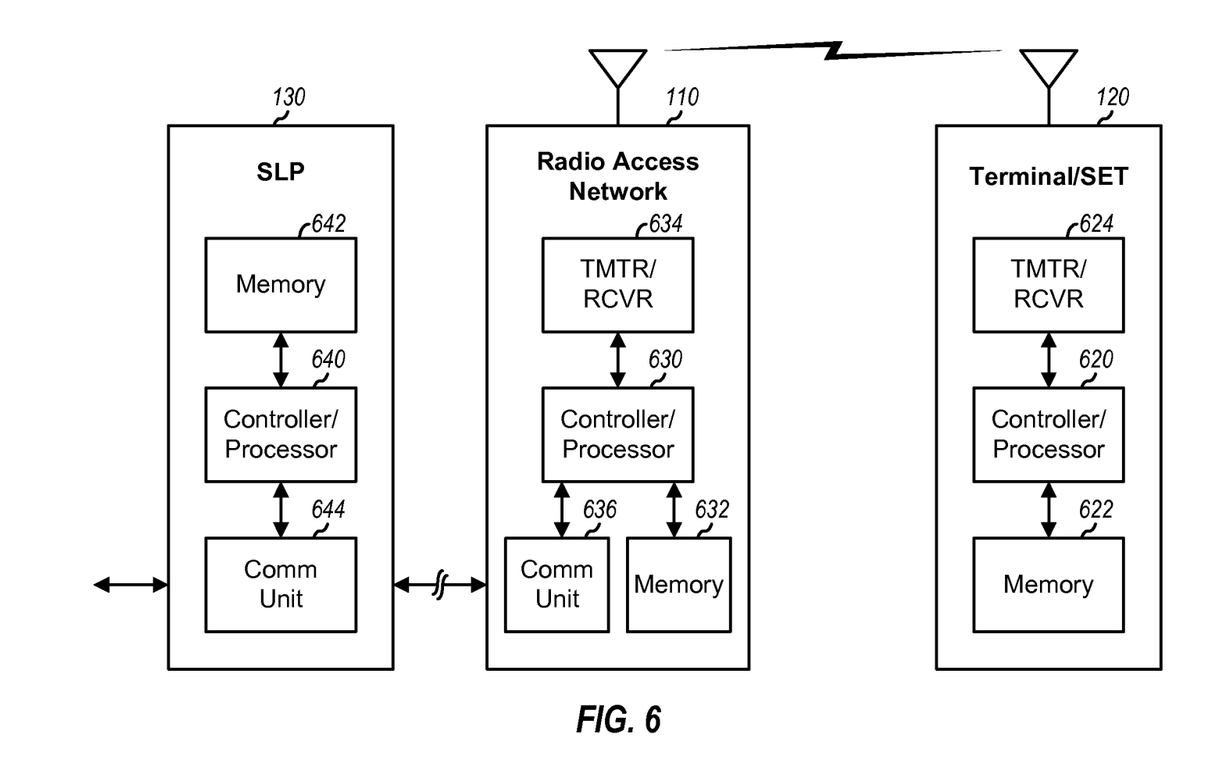
FIG. 6 shows a block diagram of a radio access network, the SET, and the SLP.

FIG. 6 shows a block diagram of a radio access network 110, terminal/SET 120, and SLP 130. Radio access network 110 may be GSM network 110a, WCDMA network 110b, CDMA network 110c, or WLAN 110d in FIG. 1. For simplicity, FIG. 6 shows only one controller/processor 620, one memory 622, and one transmitter/receiver (TMTR/RCVR) 624 for terminal 120, only one controller/processor 630, one memory 632, one transmitter/receiver 634, and one communication (Comm) unit 636 for radio access network 110, and only one controller/processor 640, one memory 642, and one communication unit 644 for SLP 130. In general, each entity may include any number of processors, controllers, memories, transmitters/receivers, communication units, etc. Terminal 120 may support radio communication with one or more radio access networks, e.g., WLAN, GSM, WCDMA, and/or CDMA networks. Terminal 120 may also receive and process signals from one or more satellite positioning systems, e.g., GPS, Galileo, etc.

On the downlink, radio access network 110 may transmit traffic data, signaling, and pilot to terminals within its coverage area. These various types of data may be processed by processor 630, conditioned by transmitter 634, and transmitted on the downlink. At terminal 120, downlink signals from radio access network 110 may be received and conditioned by receiver 624 and further processed by processor 620 to obtain various types of information. For example, receiver 624 and/or processor 620 may make timing and/or signal strength measurements for access points and/or base stations in radio access network 110. Processor 620 may perform process 400 in FIG. 4 and/or other processes for the techniques described herein. Memories 622 and 632 may store program codes and data for terminal 120 and radio access network 110, respectively.

On the uplink, terminal 120 may transmit traffic data, signaling, and pilot to radio access network 110. These various types of data may be processed by processor 620, conditioned by transmitter 624, and transmitted on the uplink. At radio access network 110, the uplink signals from terminal 120 and other terminals may be received and conditioned by receiver 634 and further processed by processor 630 to obtain various types of information from the terminals. Radio access network 110 may directly or indirectly communicate with SLP 130 via communication unit 636.

Within SLP 130, processor 640 may perform processing to support location services and positioning for terminals. For example, processor 640 may perform process 500 in FIG. 5 and/or other processes for the techniques described herein. Process 640 may also compute location estimates for terminals and/or access points, provide location information to SUPL Agent 140, etc. Memory 642 may store program codes and data for SLP 130. Communication unit 644 may allow SLP 130 to communicate with radio access network 110 and/or other network entities.

The techniques described herein may be implemented by various means. For example, these techniques may be implemented in hardware, firmware, software, or a combination thereof. For a hardware implementation, the processing units at an entity (e.g., terminal 120 or SLP 130) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with code (e.g., procedures, functions, modules, instructions, etc.) that performs the functions described herein. In general, any computer/processor-readable medium tangibly embodying firmware and/or software code may be used in implementing the techniques described herein. For example, the firmware and/or software code may be stored in a memory (e.g., memory 622, 632 or 642 in FIG. 6) and executed by a processor (e.g., processor 620, 630 or 640). The memory may be implemented within the processor or external to the processor. The firmware and/or software code may also be stored in a computer/processor-readable medium such as random access memory (RAM), read-only memory (ROM), non-volatile random access memory (NVRAM), programmable read-only memory (PROM), electrically erasable PROM (EEPROM), FLASH memory, floppy disk, compact disc (CD), digital versatile disc (DVD), magnetic or optical data storage device, etc. The code may be executable by one or more computers/processors and may cause the computer/processor(s) to perform certain aspects of the functionality described herein.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:
1. An apparatus for supporting positioning in Secure User Plane Location (SUPL), comprising:
    at least one processor to receive, at a SUPL Enabled Terminal (SET), supported network information from a SUPL Location Platform (SLP), to determine one or more radio access networks supported by the SLP based on the received supported network information, to filter network measurement information obtained at the SET according to the one or more radio access networks supported by the SLP, and to send the filtered network measurement information from the SET to the SLP, wherein, for a network-initiated session, the at least one processor to receive from the SLP a SUPL INIT message or a SUPL TRIGGERED RESPONSE message comprising the supported network information, and to send to the SLP a SUPL POS INIT message or a SUPL REPORT message comprising the filtered network measurement information and wherein, for a SET-initiated session, the at least one processor to receive from the SLP a SUPL RESPONSE message or a SUPL TRIGGERED RESPONSE message comprising the supported network information, and to send to the SLP a SUPL POS INIT message comprising the filtered network measurement information, and the at least one processor to receive a location estimate or assistance data for the SET determined by the SLP based on the filtered network measurement information; and a memory coupled to the at least one processor.

2. The apparatus of claim 1, wherein the supported network information indicates that the SLP supports network measurement information for one or more of wireless local area network (WLAN), Code Division Multiple Access (CDMA), Wideband CDMA (WCDMA), Global System for Mobile Communications (GSM), or Long Term Evolution (LTE), and wherein the filtered network measurement information sent to the SLP only includes the network measurement information supported by the SLP.

3. The apparatus of claim 1, wherein the supported network information indicates that the SLP supports wireless local area network (WLAN), and wherein the at least one processor sends WLAN access point (AP) information as the network measurement information.

4. The apparatus of claim 1, wherein the supported network information indicates that the SLP supports Code Division Multiple Access (CDMA), and wherein the at least one processor sends CDMA cell information as the network measurement information.

5. The apparatus of claim 1, wherein the supported network information indicates that the SLP supports Wideband Code Division Multiple Access (WCDMA), and wherein the at least one processor sends WCDMA cell information as the network measurement information.

6. The apparatus of claim 1, wherein the supported network information indicates that the SLP supports Global System for Mobile Communications (GSM), and wherein the at least one processor sends GSM cell information as the network measurement information.

7. The apparatus of claim 1, wherein the supported network information indicates whether the SET is allowed to send network measurement information for at least one of transmit power, antenna gain, signal-to-noise ratio (S/N), device type, signal strength, channel or frequency, and reported location for an access point (AP) in a wireless local area network (WLAN).

8. The apparatus of claim 1, wherein the supported network information indicates whether the SET is allowed to send network measurement information for round trip delay (RTD) between the SET and an access point in a wireless local area network (WLAN).

9. The apparatus of claim 1, wherein the supported network information indicates whether the SET is allowed to send network measurement information for at least one of transmit power, antenna gain, signal-to-noise ratio (S/N), and signal strength for the SET.

10. The apparatus of claim 1, wherein the supported network information indicates whether the SET is allowed to send historic network measurement information, and wherein the at least one processor sends historic network measurement information to the SLP if allowed by the supported network information.

11. The apparatus of claim 1, wherein the supported network information indicates whether the SET is allowed to send network measurement information for non-serving cells or non-serving access points, and wherein the at least one processor sends network measurement information for at least one non-serving cell or at least one non-serving access point if allowed by the supported network information.

12. A method of supporting positioning in Secure User Plane Location (SUPL), comprising:

receiving, at a SUPL Enabled Terminal (SET), supported network information from a SUPL Location Platform (SLP), comprising:

wherein, for a network-initiated session, receiving from the SLP a SUPL INIT message or a SUPL TRIGGERED RESPONSE message comprising the supported network information, wherein, for a SET-initiated session, receiving from the SLP a SUPL RESPONSE message or a SUPL TRIGGERED RESPONSE message comprising the supported network information;

determining one or more radio access networks supported by the SLP based on the received supported network information;

filtering network measurement information obtained at the SET according to the one or more radio access networks supported by the SLP;

sending the filtered network measurement information from the SET to the SLP, comprising:

wherein, for a network-initiated session, sending to the SLP a SUPL POS INIT message or a SUPL REPORT message comprising the filtered network measurement information, and wherein, for a SET-initiated session, sending to the SLP a SUPL POS INIT message comprising the filtered network measurement information; and receiving a location estimate or assistance data for the SET determined by the SLP based on the filtered network measurement information.

13. The method of claim 12, wherein the supported network information indicates that the SLP supports wireless local area network (WLAN), and wherein the sending the network measurement information comprises sending WLAN access point (AP) information as the network measurement information.

14. The method of claim 12, wherein the supported network information indicates which access network types can be measured by the SUPL SET in order to obtain network measurement information that is useable by the SLP for calculating a location estimate of the SUPL SET.

15. The method of claim 14, wherein the determining step determines the one or more radio access networks as a set of available access networks that each correspond to one of the indicated access network types.

16. The method of claim 14, wherein the obtaining step obtains the network measurement information only for access networks that correspond to one of the indicated access network types, such that the sending step excludes, from the sending, network measurement information associated with non-supported access network types.

17. The method of claim 12, wherein the network measurement information corresponds to measurements measured by the SUPL SET by which the SLP can calculate a location estimate of the SUPL SET.

18. The method of claim 17, wherein the receiving step receives the network measurement information only for access networks that correspond to one of the indicated access network types, such that network measurement information associated with non-supported access network types is excluded.

19. An apparatus for supporting positioning in Secure User Plane Location (SUPL), comprising:
 means for receiving, at a SUPL Enabled Terminal (SET), supported network information from a SUPL Location Platform (SLP), comprising:
  wherein, for a network-initiated session, means for receiving from the SLP a SUPL INIT message or a SUPL TRIGGERED RESPONSE message comprising the supported network information,
  wherein, for a SET-initiated session, means for receiving from the SLP a SUPL RESPONSE message or a SUPL TRIGGERED RESPONSE message comprising the supported network information;
 means for determining one or more radio access networks supported by the SLP based on the received supported network information;
 means for filtering network measurement information obtained at the SET according to the one or more radio access networks supported by the SLP;
 means for sending the filtered network measurement information from the SET to the SLP, comprising:
  wherein, for a network-initiated session, means for sending to the SLP a SUPL POS INIT message or a SUPL REPORT message comprising the filtered network measurement information, and
  wherein, for a SET-initiated session, means for sending to the SLP a SUPL POS INIT message comprising the filtered network measurement information; and
 means for receiving a location estimate or assistance data for the SET determined by the SLP based on the filtered network measurement information.

20. The apparatus of claim 19, wherein the supported network information indicates that the SLP supports wireless local area network (WLAN), and wherein the means for sending the network measurement information comprises means for sending WLAN access point (AP) information as the network measurement information.

21. A computer program product, comprising:
 a non-transitory computer-readable medium comprising:
 code for causing a SUPL Enabled Terminal (SET) to receive supported network information from a SUPL Location Platform (SLP) comprising:
  wherein, for a network-initiated session, code for causing the SET to receive from the SLP a SUPL INIT message or a SUPL TRIGGERED RESPONSE message comprising the supported network information,
  wherein, for a SET-initiated session, code for causing the SET to receive from the SLP a SUPL RESPONSE message or a SUPL TRIGGERED RESPONSE message comprising the supported network information;
 code for causing the SET to determine one or more radio access networks supported by the SLP based on the received supported network information;
 code for causing the SET to filter network measurement information obtained at the SET according to the one or more radio access networks supported by the SLP;
 code for causing the SET to send the filtered network measurement information from the SET to the SLP, comprising:
  wherein, for a network-initiated session, code for causing the SET to send to the SLP a SUPL POS INIT message or a SUPL REPORT message comprising the filtered network measurement information, and
  wherein, for a SET-initiated session, code for causing the SET to send to the SLP a SUPL POS INIT message comprising the filtered network measurement information; and
 code for causing the SET to receive a location estimate or assistance data for the SET determined by the SLP based on the filtered network measurement information.

22. An apparatus for supporting positioning in Secure User Plane Location (SUPL), comprising:
 at least one processor to send from a SUPL Location Platform (SLP) to a SUPL Enabled Terminal (SET) supported network information indicating one or more radio access networks supported by the SLP, to receive from the SET network measurement information only for at least one of the one or more radio access networks supported by the SLP, and to provide a location estimate or assistance data to the SET based on the received network measurement information, wherein:
 for a network-initiated session, the at least one processor to send to the SET a SUPL INIT message comprising the supported network information, and to receive from the SET a SUPL POS INIT message or a SUPL REPORT message comprising the network measurement information, and
 for a SET-initiated session, the at least one processor to send to the SET a SUPL RESPONSE message or a SUPL TRIGGERED RESPONSE message comprising the supported network information, and to receive from the SET a SUPL POS INIT message comprising the network measurement information; and
 a memory coupled to the at least one processor.

23. The apparatus of claim 22, wherein the at least one processor determines a first location estimate for the SET based on the network measurement information, obtains a second location estimate for the SET based on a positioning method, and determines a final location estimate for the SET based on the first and second location estimates.

24. The apparatus of claim 22, wherein the supported network information indicates that the SLP supports network measurement information for one or more of wireless local area network (WLAN), Code Division Multiple Access (CDMA), Wideband CDMA (WCDMA), Global System for Mobile Communications (GSM), or Long Term Evolution (LTE) such that the network measurement information received from the SET does not include network measurement information that is not supported by the SLP.

25. The apparatus of claim 22, wherein the supported network information indicates whether the SET is allowed to send network measurement information for at least one of transmit power, antenna gain, signal-to-noise ratio (S/N), device type, signal strength, channel or frequency, and reported location for an access point (AP) in a wireless local area network (WLAN).

26. The apparatus of claim 22, wherein the supported network information indicates whether the SET is allowed to send network measurement information for round trip delay (RTD) between the SET and an access point in a wireless local area network (WLAN).

27. The apparatus of claim 22, wherein the supported network information indicates whether the SET is allowed to send network measurement information for at least one of transmit power, antenna gain, signal-to-noise ratio (S/N), and signal strength for the SET.

28. The apparatus of claim 22, wherein the supported network information indicates whether the SET is allowed to send historic network measurement information.

29. The apparatus of claim 22, wherein the supported network information indicates whether the SET is allowed to send network measurement information for non-serving cells or non-serving access points.

30. A method of supporting positioning in Secure User Plane Location (SUPL), comprising:
 sending from a SUPL Location Platform (SLP) to a SUPL Enabled Terminal (SET) supported network information indicating one or more radio access networks supported by the SLP, comprising:
  for a network-initiated session, sending to the SET a SUPL INIT message comprising the supported network information, and
  for a SET-initiated session, sending to the SET a SUPL RESPONSE message or a SUPL TRIGGERED RESPONSE message comprising the supported network information;
 receiving from the SET network measurement information only for at least one of the one or more radio access networks supported by the SLP, comprising:
  for a network-initiated session, receiving from the SET a SUPL POS INIT message or a SUPL REPORT message comprising the network measurement information, and
  for a SET-initiated session, receiving from the SET a SUPL POS INIT message comprising the network measurement information; and
 providing a location estimate or assistance data to the SET based on the received network measurement information.

31. The method of claim 30, wherein the supported network information indicates which access network types can be measured by the SUPL SET in order to obtain network measurement information that is useable by the SLP for calculating a location estimate of the SUPL SET.

32. The method of claim 30, wherein the network measurement information corresponds to measurements measured by the SUPL SET by which the SLP can calculate a location estimate of the SUPL SET.

33. An apparatus for supporting positioning in Secure User Plane Location (SUPL), comprising:
 means for sending from a SUPL Location Platform (SLP) to a SUPL Enabled Terminal (SET) supported network information indicating one or more radio access networks supported by the SLP comprising:
  for a network-initiated session, means for sending to the SET a SUPL INIT message comprising the supported network information, and
  for a SET-initiated session, means for sending to the SET a SUPL RESPONSE message or a SUPL TRIGGERED RESPONSE message comprising the supported network information;
 means for receiving from the SET network measurement information only for at least one of the one or more radio access networks supported by the SLP comprising:
  for a network-initiated session, means for receiving from the SET a SUPL POS INIT message or a SUPL REPORT message comprising the network measurement information, and
  for a SET-initiated session, means for receiving from the SET a SUPL POS INIT message comprising the network measurement information; and
 means for providing a location estimate or assistance data to the SET based on the received network measurement information.

34. A computer program product, comprising:
 a non-transitory computer-readable medium comprising:
 code for causing at least one computer to send from a Secure User Plane Location (SUPL) Location Platform (SLP) to a SUPL Enabled Terminal (SET) supported network information indicating one or more radio access networks supported by the SLP comprising:
  for a network-initiated session, code for causing the at least one computer to send to the SET a SUPL INIT message comprising the supported network information, and
  for a SET-initiated session, code for causing the at least one computer to send to the SET a SUPL RESPONSE message or a SUPL TRIGGERED RESPONSE message comprising the supported network information;
 code for causing the at least one computer to receive from the SET network measurement information only for at least one of the one or more radio access networks supported by the SLP, comprising:
  for a network-initiated session, code causing the at least one computer to receive from the SET a SUPL POS INIT message or a SUPL REPORT message comprising the network measurement information, and
  for a SET-initiated session, code for causing the at least one computer to receive from the SET a SUPL POS INIT message comprising the network measurement information; and
 code for causing the at least one computer to provide a location estimate or assistance data to the SET based on the received network measurement information.

* * * * *